C. M. BAXTER.
Hot-Air Furnace.

No. 8,822. Reissued July 29, 1879.

*Witnesses.*
S. N. Piper
W W Lund

*Inventor.*
Charles M. Baxter
by attorney.
R. K. Eddy

THE ECKERT LITHOGRAPHING CO., WASHINGTON, D. C.

UNITED STATES PATENT OFFICE.

CHARLES M. BAXTER, OF LEBANON, NEW HAMPSHIRE.

IMPROVEMENT IN HOT-AIR FURNACES.

Specification forming part of Letters Patent No. 208,784, dated October 8, 1878; Reissue No. 8,822, dated July 29, 1879; application filed March 19, 1879.

*To all whom it may concern:*

Be it known that I, CHARLES M. BAXTER, of Lebanon, in the county of Grafton and State of New Hampshire, have invented certain new and useful Improvements in Hot-Air Furnaces; and I do hereby declare that the following is a full, clear, and exact description of the invention, which will enable others skilled in the art to which it appertains to make and use the same, reference being had to the accompanying drawings, and to the letters of reference marked thereon, which form a part of this specification.

The nature of my invention is fully defined in the claims hereinafter presented.

Figure 1:
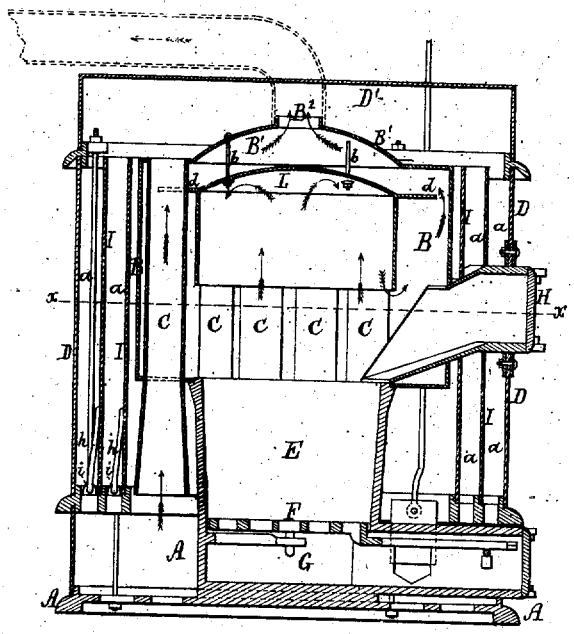
Figure 2:
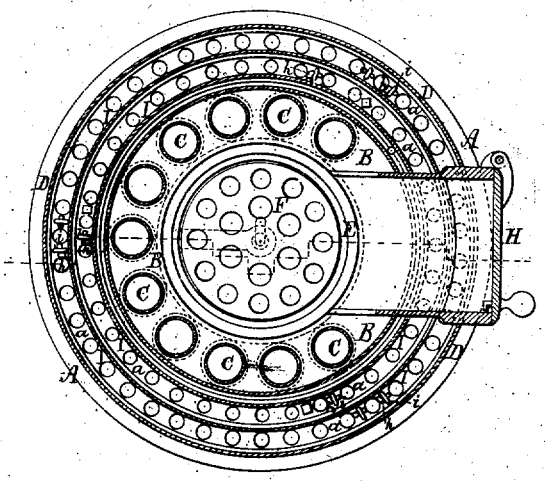

In the drawings, Figure 1 is a central vertical section of my improved hot-air furnace. Fig. 2 is a transverse section of the same on the line *x x*, Fig. 1.

A represents the base of my hot-air furnace or radiator. B is the shell of the furnace proper, with fire-pot E, having grate F and ash-pit G, as shown. D is the outside jacket, and on top of the furnace is the hot-air chamber D′. H is the door for admitting fuel into the fire-box.

Within the furnace-shell B is arranged a series of vertical air-pipes, C C, having their lower ends made flaring and opening within the base A, the upper end of said pipes opening into the hot-air chamber D′. These pipes C C are disposed in a circle concentric with the shell B and fire pot E.

The top of the furnace or shell B forms a dome, $B^1$, having a smoke-outlet, $B^2$, which latter may have a smoke-pipe passing out as indicated by the dotted lines in Fig. 1, or in any other suitable manner.

Above the fire-pot E is a dome, L, suspended from the furnace-dome $B^1$ by rods *b*, or any other suitable or convenient means. This dome L is made somewhat in the form of an inverted cup, and has at or near the top a projecting flange, *d*, which is cut out for the passage of the tubes C. In other words, this flange *d* extends between the tubes to within a certain distance of the furnace-shell B, leaving, however, a suitable space between said shell and the edge of the flange for the escape of the smoke.

The smoke and volatile products of combustion from the fire-pot E pass upward into the dome L, where proper combustion takes place, and thence downward under the lower edge of the dome, and between and around the tubes C, striking the inner surface of the shell B, and thence upward around the flange *d* to the furnace-dome $B^1$, and out of the exit $B^2$.

Between the furnace-shell B and the outside jacket, D, I interpose one or more concentric jackets, I, so as to form a succession of jackets around the furnace, with annular air-spaces *a a* between the same for the passage of air from the base A to the top hot-air chamber D′, whereby all loss of heat by radiation into the cellar is prevented.

The intermediate jackets, I, are held to the base by means of hooks *h* and eyes *i*, as shown.

What I claim as new in the above-described air-heating apparatus is as follows, viz:

1. The combination of the fire-pot, the smoke-chamber, and the reverberatory dome and its projecting flange with the series of pipes open at their ends and arranged with such dome and flange, and within and extending from the top to the bottom of the smoke-chamber, as set forth.

2. The combination of the fire-pot, the smoke-chamber, and the reverberatory dome arranged within such smoke-chamber, as shown, with the series of pipes arranged in and going through the smoke-chamber, and projecting below it to or nearly to the bottom of the fire-pot, and arranged around such pot, as set forth.

3. The combination of the furnace-shell B, provided with dome $B^1$ and smoke-exit $B^2$, with the fire-pot E, tubes C, and interior dome, L, with flange *d*, cut to project between the tubes, substantially as and for the purpose hereinbefore set forth.

4. The combination of the furnace-shell provided with one or more surrounding jackets, and with a dome, $B^1$, and smoke-exit $B^2$, with the fire-pot E, tubes C, and interior dome, L, with flange *d*, cut to project between the tubes, substantially as and for the purposes hereinbefore set forth.

5. The combination of the fire-pot, the smoke-chamber, and the reverberatory dome arranged within such smoke-chamber, as shown, with the series of pipes open at their ends, and arranged with such dome, and within and extending from the top to the bottom of the smoke-chamber, as set forth.

CHARLES M. BAXTER.

Witnesses:
C. A. DOLE,
C. L. FOSTER.